United States Patent
Lorenz et al.

(10) Patent No.: US 9,366,318 B2
(45) Date of Patent: *Jun. 14, 2016

(54) GEARBOX, IN PARTICULAR FOR THE DRIVE TRAIN OF A VEHICLE

(75) Inventors: Daniel Lorenz, Bad Kissingen (DE);
Cora Carlson, Dittelbrunn (DE);
Thomas Weigand, Schweinfurt (DE);
Thomas Dögel, Nüdlingen (DE);
Michael Kühner, Heilbronn (DE);
Andreas Orlamünder, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/111,128

(22) PCT Filed: Mar. 12, 2012

(86) PCT No.: PCT/EP2012/054192
§ 371 (c)(1),
(2), (4) Date: Oct. 30, 2013

(87) PCT Pub. No.: WO2012/139828
PCT Pub. Date: Oct. 18, 2012

(65) Prior Publication Data
US 2014/0047949 A1     Feb. 20, 2014

(30) Foreign Application Priority Data

Apr. 11, 2011 (DE) .......................... 10 2011 007 117

(51) Int. Cl.
*F16H 57/00* (2012.01)
*F16H 3/02* (2006.01)
(Continued)

(52) U.S. Cl.
CPC ............ *F16H 3/02* (2013.01); *F16F 15/13157* (2013.01); *F16H 3/66* (2013.01);
(Continued)

(58) Field of Classification Search
None
See application file for complete search history.

(56) References Cited

U.S. PATENT DOCUMENTS

| 5,040,433 A | 8/1991 | Reik et al. |
| 5,863,274 A | 1/1999 | Jäckel |

(Continued)

FOREIGN PATENT DOCUMENTS

| DE | 36 30 398 A1 | 5/1987 |
| DE | 38 34 284 A1 | 4/1990 |

(Continued)

*Primary Examiner* — Erin D Bishop
(74) *Attorney, Agent, or Firm* — Cozen O'Connor (57) ABSTRACT

A transmission includes a transmission input element, a transmission output element and a gear ratio changing system in a torque path between the transmission input element and the transmission output element. A torsional vibration damping arrangement with an input region and an output region is provided in the torque path. A first torque transmission path and, parallel thereto, a second torque transmission path, and a coupling arrangement for superposing the torques transmitted via the torque transmission paths, are provided between the input region and the output region. The torsional vibration damping arrangement includes a phase shifter arrangement for generating a phase shift of rotational irregularities transmitted via the first torque transmission path relative to rotational irregularities transmitted via the second torque transmission path.

15 Claims, 9 Drawing Sheets

(51) Int. Cl.
  *F16F 15/131* (2006.01)
  *F16H 3/66* (2006.01)
  *F16H 45/02* (2006.01)

(52) U.S. Cl.
  CPC ........... *F16H 45/02* (2013.01); *F16H 57/0006* (2013.01); *F16H 2045/0268* (2013.01); *F16H 2200/006* (2013.01); *F16H 2200/2012* (2013.01); *F16H 2200/2043* (2013.01); *Y10T 74/19019* (2015.01)

(56) References Cited

U.S. PATENT DOCUMENTS

| | | | |
|---|---|---|---|
| 8,939,860 B2 * | 1/2015 | Dogel et al. | 475/36 |
| 8,991,531 B2 * | 3/2015 | Dogel | 180/65.21 |
| 2013/0068580 A1 * | 3/2013 | Doegel et al. | 192/3.28 |
| 2013/0072338 A1 * | 3/2013 | Dogel et al. | 475/116 |
| 2013/0072346 A1 * | 3/2013 | Dogel et al. | 475/347 |
| 2013/0085030 A1 * | 4/2013 | Dogel et al. | 475/59 |

FOREIGN PATENT DOCUMENTS

| | | |
|---|---|---|
| DE | 197 00 851 A1 | 7/1997 |
| DE | 197 44 528 A1 | 4/1998 |
| DE | 100 24 281 A1 | 11/2001 |
| DE | 103 12 785 A1 | 10/2004 |
| DE | 10 2008 001 049 A1 | 10/2009 |
| DE | 10 2011 075 242 A1 | 12/2011 |
| EP | 2 108 859 A2 | 10/2009 |

* cited by examiner

GEARBOX, IN PARTICULAR FOR THE DRIVE TRAIN OF A VEHICLE

CROSS-REFERENCE TO RELATED APPLICATIONS

This is a U.S. national stage of application No. PCT/EP2012/054192, filed on 12 Mar. 2012, which claims priority to the German Application No.: 10 2011 007 117.2, filed: 11 Apr. 2011, the content of both incorporated herein by reference.

BACKGROUND OF THE INVENTION

1. Field of the Invention

The present invention is directed to a transmission that is used, for example, in the drivetrain of a vehicle for transmitting torque between a drive unit, e.g., an internal combustion engine, and the driven wheels in order to adapt the gear ratio to different driving states. For example, a gear unit of this kind can be constructed as an automatic transmission or as an automated shift transmission, i.e., as basically automatic or self-shifting.

2. Related Art

Figure 1:
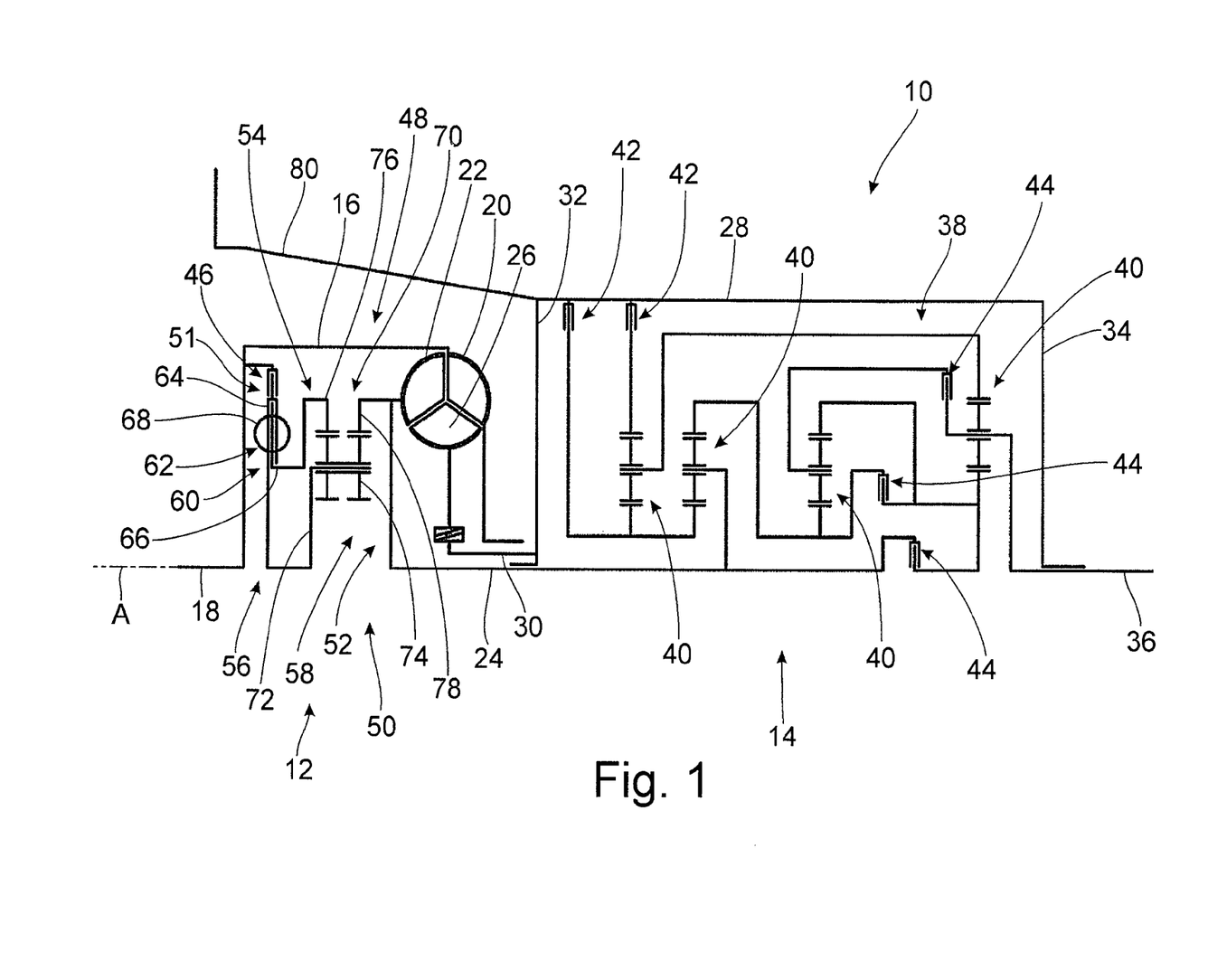
FIG. 1 is a schematic diagram showing a partial area of a drivetrain with hydrodynamic torque converter and automatic transmission and torsional vibration damping arrangement with power split integrated in the torque converter.

FIG. 1 shows a portion of a drivetrain, designated generally by 10, of a vehicle. This portion comprises a hydrodynamic torque converter 12 and an automatic transmission 14 downstream thereof in the torque path.

A housing 16 of the torque converter 12 is formed for coupling to a driveshaft 18, i.e., for example, a crankshaft of an internal combustion engine, and carries an impeller 20. Arranged in the interior of the housing 16 is a turbine 22, which is coupled, for example by toothed engagement, via a turbine hub, not shown, or a driven hub in general, to a transmission input shaft, designated generally by 24, so as to rotate jointly around an axis of rotation A. Further, a stator, designated generally by 26, is arranged in the interior of the housing 16 and is mounted so as to be rotatable in one direction around the axis of rotation A on a supporting hollow shaft 30 supported at a transmission housing 28.

The transmission input shaft 24 is rotatably supported at the transmission housing 28, for example, at a housing wall 32 thereof. A transmission output shaft 36 is rotatably supported at another housing wall 34 at a distance axially from housing wall 32. A gear ratio changing system, designated generally by 38, is located in the torque path between the transmission input shaft 24 and the transmission output shaft 36. In the illustrated example of an automatic transmission, this gear ratio changing system 38 comprises a plurality of planetary gear stages 40, brakes 42 and clutches 44. By controlling or activating/deactivating the brakes 42 and clutches 44, the torque path via the various planetary gear stages 40 and consequently the gear ratio between the transmission input shaft 24 and the transmission output shaft 36 can be varied.

A torsional vibration damping arrangement, designated generally by 48, is arranged in the torque converter 12 in the torque path between a lockup clutch 46 and the driven hub or transmission input shaft 24. This torsional vibration damping arrangement 48 has an input region 50, which is provided, for example, by the output portion of the lockup clutch 46, and an output region 52, which is also coupled to the turbine 22 and which, for example, also provides the driven hub. Two parallel torque transmission paths 54, 56 are formed between the input region 50 and the output region 52. These two parallel torque transmission paths 54, 56 split in the input region 56 and converge again in the region of a coupling arrangement designated generally by 58. As a result, the torque components that are transmitted along the two torque transmission paths 54, 56, and that comprise the torque which is to be transmitted and is received at the input region 50, are brought together in the coupling arrangement 58 and received at the output region 52. A first torque transmission path 54 of the two torque transmission paths 54, 56 comprises a phase shifter arrangement 60. The phase shifter arrangement 60 is formed with a vibration system 62, which comprises a primary side 64 formed, for example, with two cover disk elements, a secondary side 66 formed with a central disk element, and a spring arrangement 68. The primary side 64 and the secondary side 66 can rotate relative to one another around the axis of rotation against the return force of the spring arrangement, for example, a plurality of helical compression springs that are distributed in circumferential direction and which can be supported at the primary side 64 and secondary side.

When there are rotational irregularities or torsional vibrations in the torque to be transmitted, vibrations are excited in the vibration system 62 of the phase shifter arrangement 60. Provided this excitation of vibrations takes place at a frequency below the natural frequency of the vibration system 62, the vibration system 62 operates subcritically, meaning that the excitation of vibrations and the reaction of the vibration system 62 are in phase with one another. When the excitation frequency or vibration frequency exceeds the natural frequency of the vibration system 62, this vibration system 62 passes into a supercritical state in which a phase shift is produced between excitation and reaction, which ideally can be a maximum of 180° so that the reaction, i.e., the vibration of the secondary side 66, is essentially 180° out of phase with the excitation, i.e., with the vibration of the primary side 64.

Due to the fact that the torque to be transmitted is divided into two torque transmission paths 54, 56, torque components containing vibrations or rotational irregularities are transmitted via these two torque transmission paths 54, 56. Since the second torque transmission path 56 in the illustrated example has no phase shifter arrangement but rather is, for example, comparatively rigid, i.e., cannot vibrate resonantly in the range of the occurring excitation frequencies, the torque components transmitted via the two torque transmission paths 54, 56 can, as was already mentioned, be shifted in phase relative to one another ideally by a maximum of 180° with respect to the vibrations contained therein. When these two torque components converge in the coupling arrangement 58, these out-of-phase vibration components are superposed on one another such that, ideally, these vibration components cancel each other out virtually completely due to the mutual phase shift. The torque that is sent on to the output region 52 then substantially contains no more vibration components or appreciably fewer vibration components and is conveyed onward in this manner to the rest of the drivetrain, in this case the transmission input shaft 24 and transmission 14.

The coupling arrangement 58 comprises a planetary gear arrangement 70 with a planet wheel carrier 72 provided in the second torque transmission path 56. This planet wheel carrier 72 carries a plurality of planet wheels 74 that are distributed in a circumferential direction. Each planet wheel 74 cooperates with a drive-side ring gear 76 provided in the first torque transmission path 54 at the secondary side 66 of the vibration system 62 and with a driven-side ring gear 78, which is provided at the output region 52 and which is also, for example, coupled with the turbine 22 so as to be fixed with respect to rotation relative to it. For this purpose, the planet wheels 74 can be formed with toothed areas. The gear ratio that can be achieved in the coupling arrangement 58 can be adjusted through the configuration of the planet wheels 74 and ring gears 76, 78, respectively. A gear ratio of 1 results when both ring gears 76, 78 are substantially identical with respect to their toothing and diameter such that the two toothed regions of the planet wheels 74 associated with the ring gears 76, 78 can be provided, for example, by a continuous toothing. However, a gear ratio of 1 means that the entire torque is transmitted via the first torque transmission path 54 and, therefore, no phase shift is generated that can be used for a canceling superposition of vibrations. When the gear ratio has a value other than 1, depending on whether this value is greater than or less than 1, the torque component transmitted via the two torque transmission paths 54, 56 is adjusted and the above-mentioned superposition of vibration components with at least partial cancelation can accordingly be achieved. A gear ratio other than 1 such as this can be achieved, for example, in that the ring gears 76 and 78 have different addendum modifications while the toothed regions of the planet wheels 74 have the same configuration. Also, the toothed regions provided at the planet wheels 74 and associated with the ring gears 76, 78 have different diameters, which, of course, necessitates a correspondingly different diameter of the ring gears 76, 78 with respect to one another and results in a gear ratio other than 1.

SUMMARY OF THE INVENTION

It is the object of the present invention to provide a transmission also having the functionality of damping or mitigating the rotational irregularities and vibrations excited in a drivetrain.

According to one aspect of the invention, this object is met through a transmission, particularly for the drivetrain of a vehicle, comprising at least one transmission input element, at least one transmission output element and a gear ratio changing system in the torque transmission path between the at least one transmission input element and the at least one transmission output element, further comprising in the torque transmission path between the at least one transmission input element and the at least one transmission output element a torsional vibration damping arrangement with an input region and an output region. A first torque transmission path and parallel thereto a second torque transmission path and a coupling arrangement for superposing the torques transmitted via the torque transmission paths are provided between the input region and the output region. The torsional vibration damping arrangement comprises at least in the first torque transmission path a phase shifter arrangement for generating a phase shift of rotational irregularities transmitted via the first torque transmission path relative to rotational irregularities transmitted via the second torque transmission path.

Accordingly, in the present invention the vibration damping characteristic brought about by the splitting and superposition of torque is integrated in the transmission itself. This results in substantial advantages. For one, this provides room outside of the housing, i.e., for example, in the area of the transmission bellhousing 80, also shown in FIG. 1, for installing other system components and generally takes up less installation space. For another, transmissions are generally constructed with an enclosed volume region that is formed in the transmission housing and in which the gear ratio changing system is contained and is lubricated with a liquid, generally oil. When at least a portion of a torsional vibration damping arrangement with the construction described above and the functionality described above is integrated in the transmission, this lubricating liquid can also be used to lubricate the torsional vibration damping arrangement, particularly the coupling arrangement thereof. This is important insofar as the friction effects occurring in the torsional vibration damping arrangement, particularly also in the coupling arrangement thereof, can negatively influence the vibration behavior and, therefore, also the phase shift occurring when passing into the supercritical state. Friction effects of this kind as well as wear effects can be mitigated by making use of the lubricating action of the lubricating liquid. Further, when the torsional vibration damping arrangement is integrated into the transmission, it is less subject to the wobbling movements which are inevitable in a drivetrain due to axial offset or axial tilt and which can likewise lead to high loads particularly also in the area of the coupling arrangement and, of course, can also disadvantageously affect the phase shift characteristic.

It can be provided in the transmission according to the invention, for example, that the phase shifter arrangement comprises a vibration system with a primary side and a secondary side that is rotatable relative to the primary side around the axis of rotation against the action of a spring arrangement.

Also, because of the high mechanical stability, the coupling arrangement in the construction according to the invention is preferably constructed as a planetary gear arrangement and can comprise a planet wheel carrier that is connected with the second torque transmission path and has a plurality of planet wheels rotatably supported thereon.

In another aspect, to transmit torque in and out of the first torque transmission path or for torque output in the output region, it can be provided that the planetary gear arrangement includes a first coupling gear arrangement in meshing engagement with the planet wheels connected to the first torque transmission path and a second coupling gear arrangement in meshing engagement with the planet wheels connected to the output region. The two coupling gear arrangements can be constructed either as a ring gear arrangement, above all so as to make efficient use of the installation space located radially outward of the planet wheels, or can be constructed as a sun wheel arrangement above all so as to make efficient use of the radially inner installation space.

In another aspect, to adjust the vibration behavior of the vibration system provided in the first torque transmission path, this vibration system can include at least two vibration dampers arranged in series with one another and respectively comprising a primary side and a secondary side that is rotatable relative to the primary side. Alternatively or in addition, it can be provided that the vibration system includes at least two vibration dampers acting in parallel with one another and respectively comprising a primary side and a secondary side that is rotatable relative to the primary side.

In another aspect, for integrating the torsional vibration damping arrangement in the transmission, it can be provided that a torsional vibration damping arrangement is arranged in the torque transmission path between at least one transmission input element and the gear ratio changing system. Alternatively or in addition, it can be provided that a torsional vibration damping arrangement is arranged in the torque transmission path between the gear ratio changing system and at least one transmission output element. As a result, the gear ratio changing system itself can remain unchanged compared with a conventional construction and the vibration damping functionality is retained in the torque path upstream and/or downstream thereof through power splitting and superposition of vibrations.

The lubricating functionality provided by a lubricating liquid in a transmission can be used in a structurally simple manner in that the gear ratio changing system is received in an enclosed volume region of a transmission housing and in that at least a portion of the torsional vibration damping arrangement is arranged at least partially, preferably in its entirety, in the volume region. For this purpose, the portion received in the volume region can, for example, comprise the coupling arrangement.

In another aspect, it can further be provided that a portion of the torsional vibration damping arrangement is arranged outside of the volume region, wherein the portion provided outside of the volume region can comprise the phase shifter arrangement, while, for example, the coupling arrangement can be arranged in the volume region. This has the advantage that, because of its arrangement outside the volume region, this phase shifter assembly, for whose functionality the lubricating effect has less importance than for the coupling arrangement, opens up installation space in the volume region or the volume region itself can be made smaller.

In a constructional variant that is particularly advantageous with respect to the merging of functions, it can be provided that the coupling arrangement forms a part of the gear ratio changing system. This makes it possible to enlarge the ratio-changing spectrum of the gear ratio changing system, or to modify the rest of the areas of the gear ratio changing system in a corresponding manner, so that a very compact overall size can be achieved.

In an embodiment that is particularly advantageous as regards integration in a drivetrain, at least one transmission input element can be a transmission input shaft that is rotatably supported at a transmission housing and/or at least one transmission output element can be a transmission output shaft that is rotatably supported at the transmission housing.

Further, the effects of the present invention are achieved particularly efficiently when the transmission is an automatically shifting transmission, preferably an automatic transmission or automated transmission.

It should be noted in that connection that the principle of the present invention can be applied in connection with automatic or automated transmissions of many different designs. Thus the transmission can be a conventionally constructed automatic transmission with a plurality of planetary gear stages as has already been described referring to FIG. 1. Standard transmissions with automated shifting, for example, dual clutch transmissions with two transmission input shafts, can also be used in connection with the present invention. Of course, it is possible to provide a torsional vibration damping arrangement with power split associated with only one transmission input shaft or with two transmission input shafts. It is also possible to provide a torsional vibration damping arrangement of this type in transmissions having a plurality of output shafts, for example, for use in all-wheel drive vehicles, so as to be associated respectively with one or both output shafts.

BRIEF DESCRIPTION OF DRAWINGS

The present invention will be described in detail in the following with reference to the accompanying drawings. In the drawings.

DETAILED DESCRIPTION OF THE PRESENTLY PREFERRED EMBODIMENTS

In the partial area of a drivetrain 10, shown in FIG. 2, having a hydrodynamic torque converter 12 and a transmission 14, particularly an automatic transmission, the basic construction of this transmission 14 with planetary gear stages 40, brakes 42 and clutches 44 corresponds to the construction described with reference to FIG. 1 so that this description may be referred to in this respect. As regards its basic construction, the torque converter 12 also corresponds to the construction described above.

Figure 2:
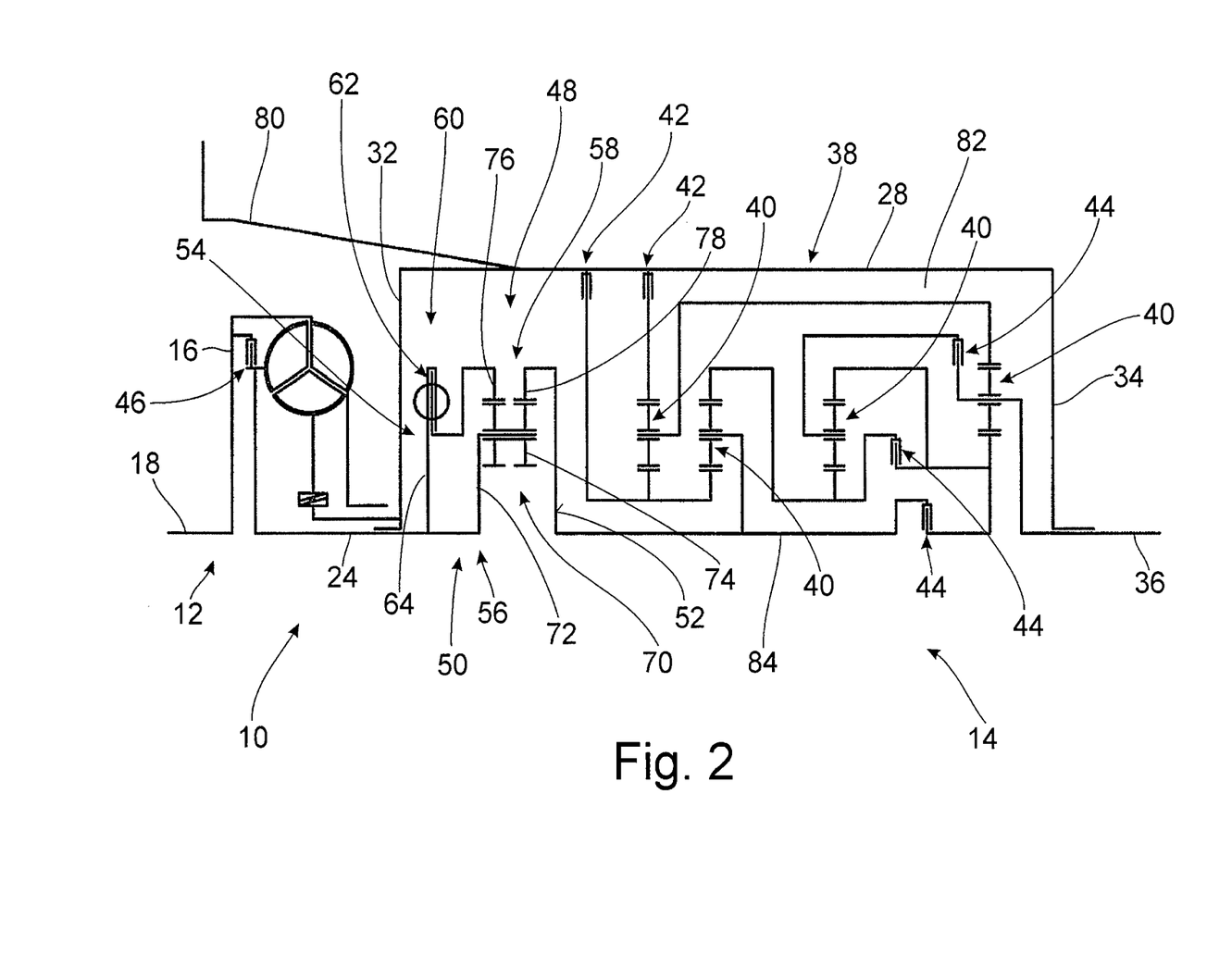
FIG. 2 is a view corresponding to FIG. 1 with torsional vibration damping arrangement integrated in the transmission.

It will be seen in FIG. 2 that the torsional vibration damping arrangement 48 with its phase shifter arrangement 60 and its coupling arrangement 58 is integrated in the volume region 82, which is enclosed by the transmission housing 28 and in which the gear ratio changing system 38 is also contained. The transmission input shaft 24, which is rotatably supported at the housing 28, substantially provides the input region 50 of the torsional vibration damping arrangement 48. The two torque transmission paths 54 and 56 proceed from the transmission input shaft 24. For example, the primary side 64 of the vibration system 62 is connected to the transmission input shaft 24, likewise the planet wheel carrier 72 of the second torque transmission path 56. The driven-side ring gear 78 or output region 52 of the torsional vibration damping arrangement 48 is connected to an input shaft 84 of the gear ratio changing system 38.

In the construction shown in FIG. 2, the torsional vibration damping arrangement 58, which is received in its entirety in the volume region 82 enclosed by the transmission housing 28, is located in the torque path between the transmission input shaft 24 and the gear ratio changing system 38 so that the rotational irregularities or torsional vibrations introduced into the input region 50, i.e., the transmission input shaft 24, particularly in the engaged state of the gear ratio changing system 38, can be eliminated or at least partially mitigated before the torque passes into the gear ratio changing system 38, and a torque that is substantially free from irregularities can be transmitted in the subsequent portion of the drivetrain or transmission 24.

By integrating the torsional vibration damping arrangement 48 in the volume region 82, the lubricating effect of the lubricating fluid, which is also contained in this volume region 82 can be made use of in particular in an advantageous manner in the various system areas of the torsional vibration damping arrangement 58. Further, it is kept substantially free from wobbling excitation of the driveshaft 18. It will further be seen in FIG. 2 that the torque converter 12 has an appreciably smaller overall size and can be accommodated in a transmission bellhousing 80, which also has correspondingly smaller dimensions.

Different variations of the transmission 14 with torsional vibration damping arrangement 48 integrated therein will be described in the following with reference to FIGS. 3 to 5. It should also be noted in this connection that the basic construction of the transmission 14 and torsional vibration damping arrangement 48 corresponds to the preceding description and reference is had to the preceding description in this respect.

Figure 3:
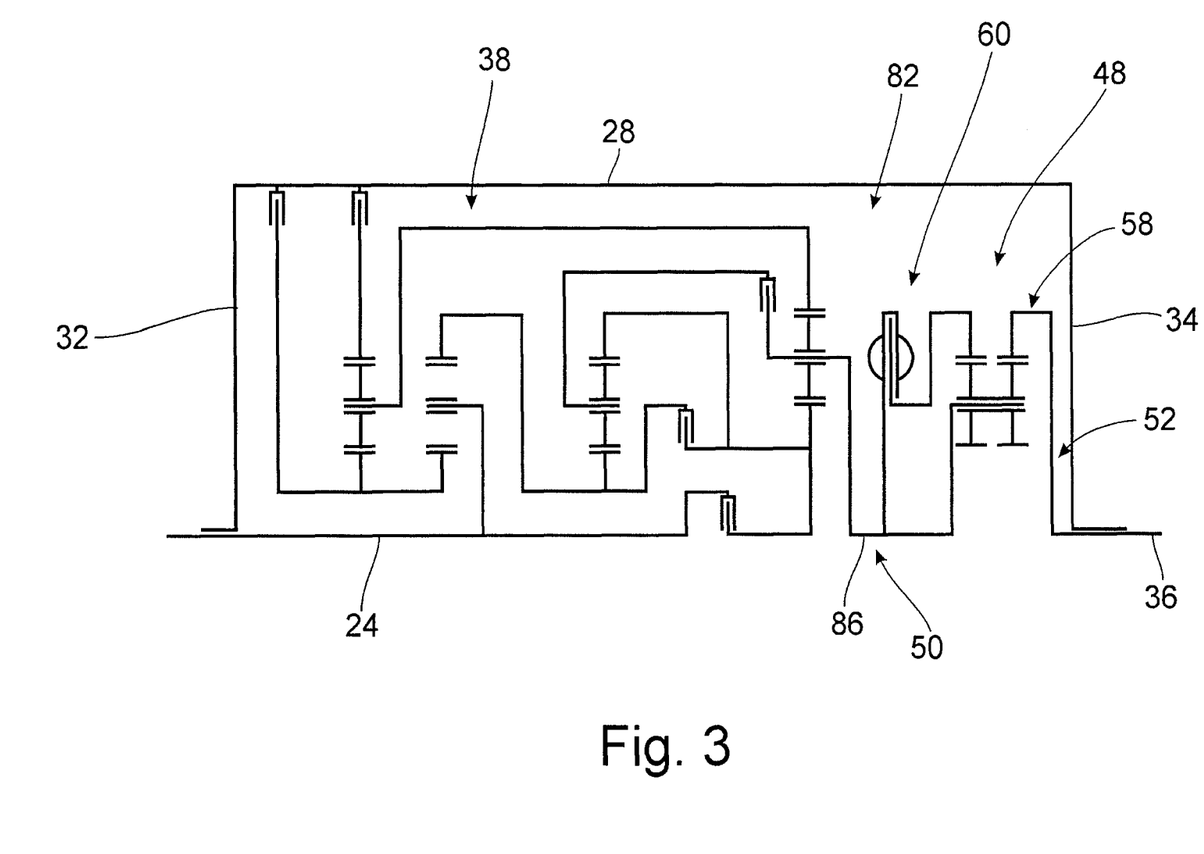
FIG. 3 is a view corresponding to FIG. 2 of an alternative type of construction.

In the embodiment form shown in FIG. 3, the torsional vibration damping arrangement 48 is arranged in the torque path between the gear ratio changing system 38 and the transmission output shaft 36. In this case, the transmission input shaft 24 also forms the input shaft for the gear ratio changing system 38, as in the transmission 14 shown in FIG. 1. An output shaft 86 of the gear ratio changing system 38 forms the input region 50 of the torsional vibration damping arrangement 48 and is coupled thereto. The output region 52 of the torsional vibration damping arrangement 48 is connected to the transmission output shaft 36.

By reason of its position, the torsional vibration damping arrangement 48 in this embodiment form cannot damp the rotational irregularities or vibrations introduced into the transmission input shaft 24 in an internal combustion engine via a torque converter or the like before they enter the gear ratio changing system. The advantage in this embodiment consists in that a correspondingly more intensive damping of vibrations can take place in the rest of the drivetrain, particularly also including vibrations excited in the gear ratio changing system 38. The advantages already mentioned above with respect to friction optimization and decoupling of wobbling are achieved here in equal measure.

Figure 4:
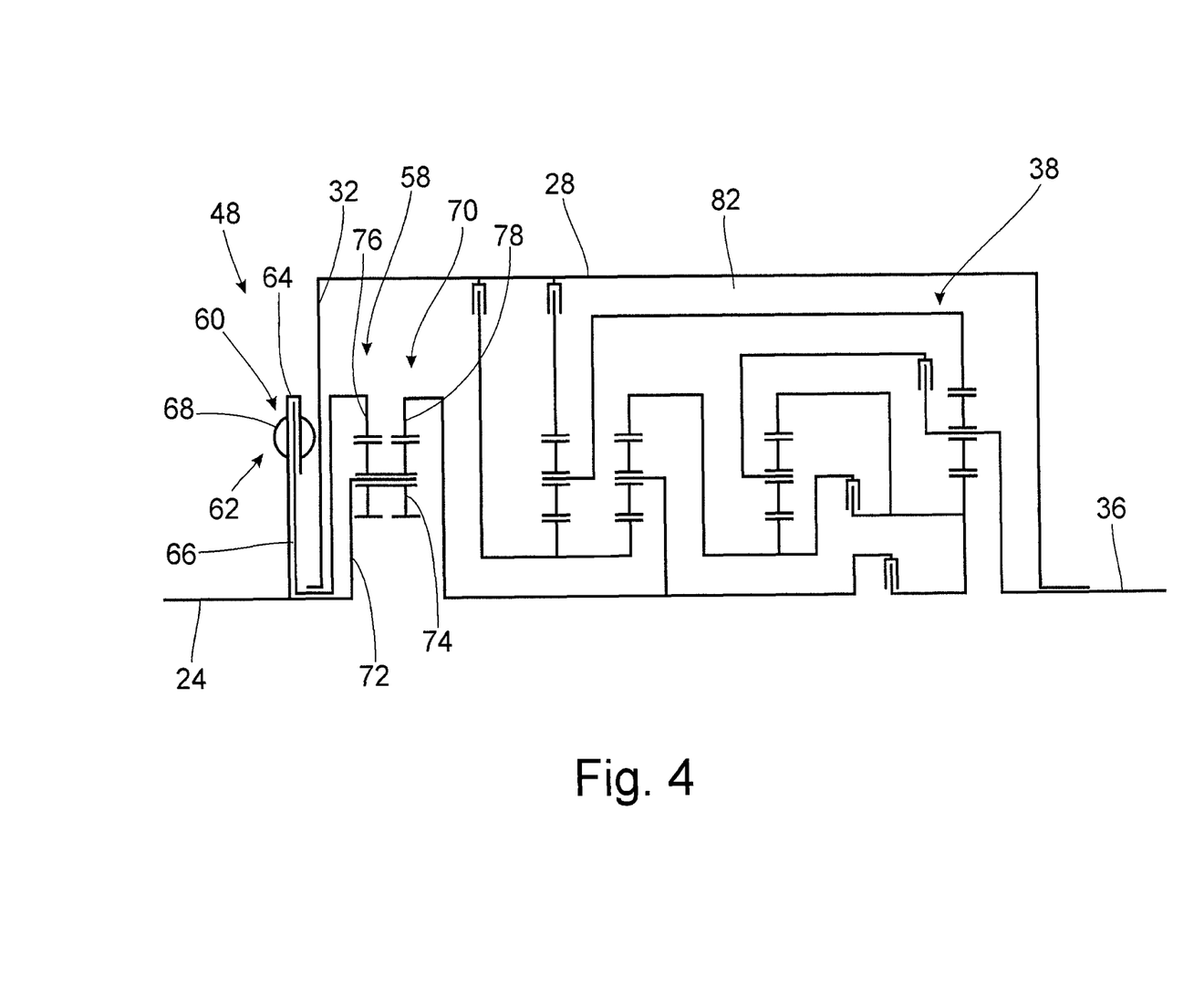
FIG. 4 is a view corresponding to FIG. 2 of an alternative type of construction.

FIG. 4 shows an embodiment in which only a portion of the torsional vibration damping arrangement 48 is integrated in the volume region 82 enclosed by the transmission housing 28. In the illustrated example, this is in particular the coupling arrangement 58 with its planetary gear arrangement 70. The phase shifter arrangement 60 and the vibration system 62 thereof lie outside of the volume region 82, for example, in the volume enclosed by the transmission bellhousing, not shown in FIG. 4. The primary side 64 of the phase shifter arrangement 60 is connected to the transmission input shaft 24 in the area outside of the transmission housing 28. The secondary side 66 extends through the housing wall 32 and is then coupled with the drive-side ring gear 76 inside the housing 28. This drive-side ring gear 76, the driven-side ring gear 78 and the planet wheel carrier 72 with planet wheels 74 supported thereon lie in the volume region 82 and can accordingly make use of the lubricating liquid contained in this volume region 82 for reducing friction.

In order to achieve reduced friction in this embodiment form through the use of a lubricating liquid also in the area of the phase shifter arrangement 60, it can be constructed as a type of torsional damper having an enclosed volume that contains the damper springs 68 and is filled with a lubricant. Alternatively, the vibration system 62 can be formed as a type of open, dry-running torsional damper.

It should further be noted that a portion of the vibration damping arrangement 48 could also be arranged in volume region 82 in the embodiment form shown in FIG. 3. For example, the phase shifter arrangement 60 could be provided so as to be located in volume region 82, while the coupling arrangement 48 would then be positioned outside of the volume region 82.

Figure 5:
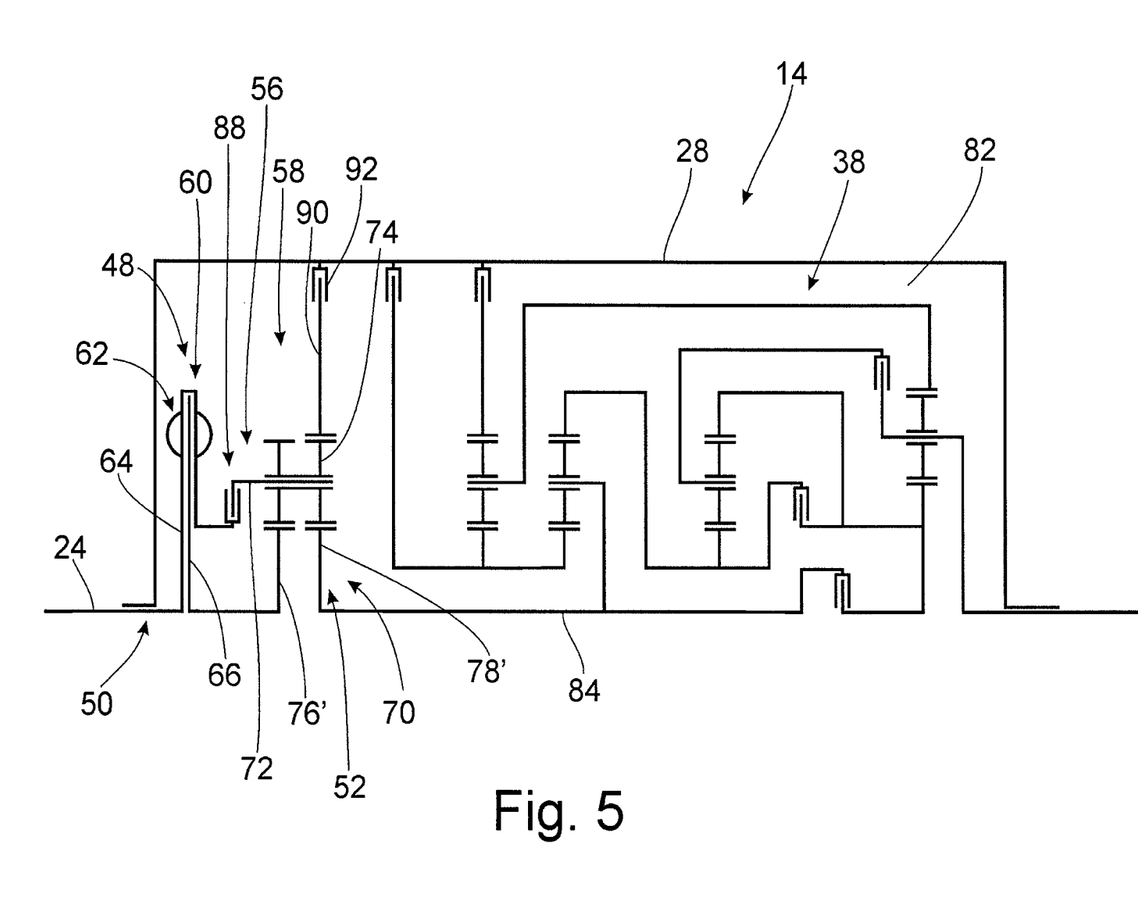
FIG. 5 is a view corresponding to FIG. 2 of an alternative type of construction.

FIG. 5 shows a constructional variant in which the coupling arrangement 48 or phase shifter arrangement 60 thereof provides a functional component part of the gear ratio changing system 38. It should be noted here that the entire torsional vibration damping arrangement 48 is arranged in volume region 82. Of course, the construction could also be the same as in FIG. 4.

A difference in the construction in the embodiment of the coupling arrangement 58 is that instead of the ring gears described above, a drive-side sun wheel 76' and a driven-side sun wheel 78' are provided radially inside the planet wheels 74 supported at the planet wheel carrier 72. The functionality described above for combining the torque components transmitted via the two torque transmission paths 54 and 56 can also be achieved in this way. In this case, the installation space located radially inside the planet wheels 74 is used. This constructional variation can also be realized in principle in the embodiment forms described above.

It will further be seen that the planet wheel carrier 72 is coupled to the primary side 64 of the vibration system 62 by a clutch 88 and via the latter to the transmission input shaft 24 and, therefore, to the input region 50. The secondary side 66 of the vibration system 62 is connected to the drive-side sun wheel 76'. The driven-side sun wheel 78 essentially provides the output region 52 and is coupled to the input shaft 84 of the gear ratio changing system 38. Further, a ring gear 90 is provided which surrounds the planet wheels 74 and which via a brake 92 can be coupled to the housing 28 optionally so as to be fixed with respect to rotation relative to it or can be allowed to rotate.

When the clutch 88 is engaged and the brake 92 is not activated, i.e., when the ring gear 90 is freely rotatable, the torsional vibration damping arrangement operates as described above.

When the clutch 88 is released, i.e., when the planet wheel carrier 72 is decoupled from the input region 50 and simultaneously by activating the brake 92 the ring gear 90 is held at the housing 28 so as to be fixed with respect to rotation relative to it, a multiplication of the rotational speed of the transmission input shaft or secondary side 66 of the vibration system 62 is achieved so that the coupling arrangement 58 or the planetary gear arrangement 70 acts as a pre-multiplication stage for shifting of this kind. Ideally, the number of gears available in the transmission 14 can be doubled in this way.

In this condition, where the torsional vibration damping arrangement 48 can no longer operate with power splitting when the clutch 88 is released because the second torque transmission path 56 comprising the planet wheel carrier 72 is interrupted, the vibration system 62 acts as a conventional torsional vibration damper whose primary side 64 is coupled to the driving transmission input shaft 24 and whose secondary side 66 is connected via the pre-multiplication stage, i.e., the planetary gear arrangement 70, to the input shaft 84 of the gear ratio changing system 38.

This effect can likewise be used to form the gear ratio changing system 38 with fewer gear ratio changing options, that is, basically to make it more compact so that the transmission 14 can basically be constructed with a very compact overall size by integrating the torsional vibration damping arrangement 48 in the transmission 14 and also merging the functions. For example, a gear ratio changing system 38, that is basically constructed for supplying eight different speeds can be rearranged so as to be configured to supply only four speeds, and by providing a pre-multiplication stage the torsional vibration damping arrangement 48 allows a total of eight different gear steps to be used.

Figure 6:
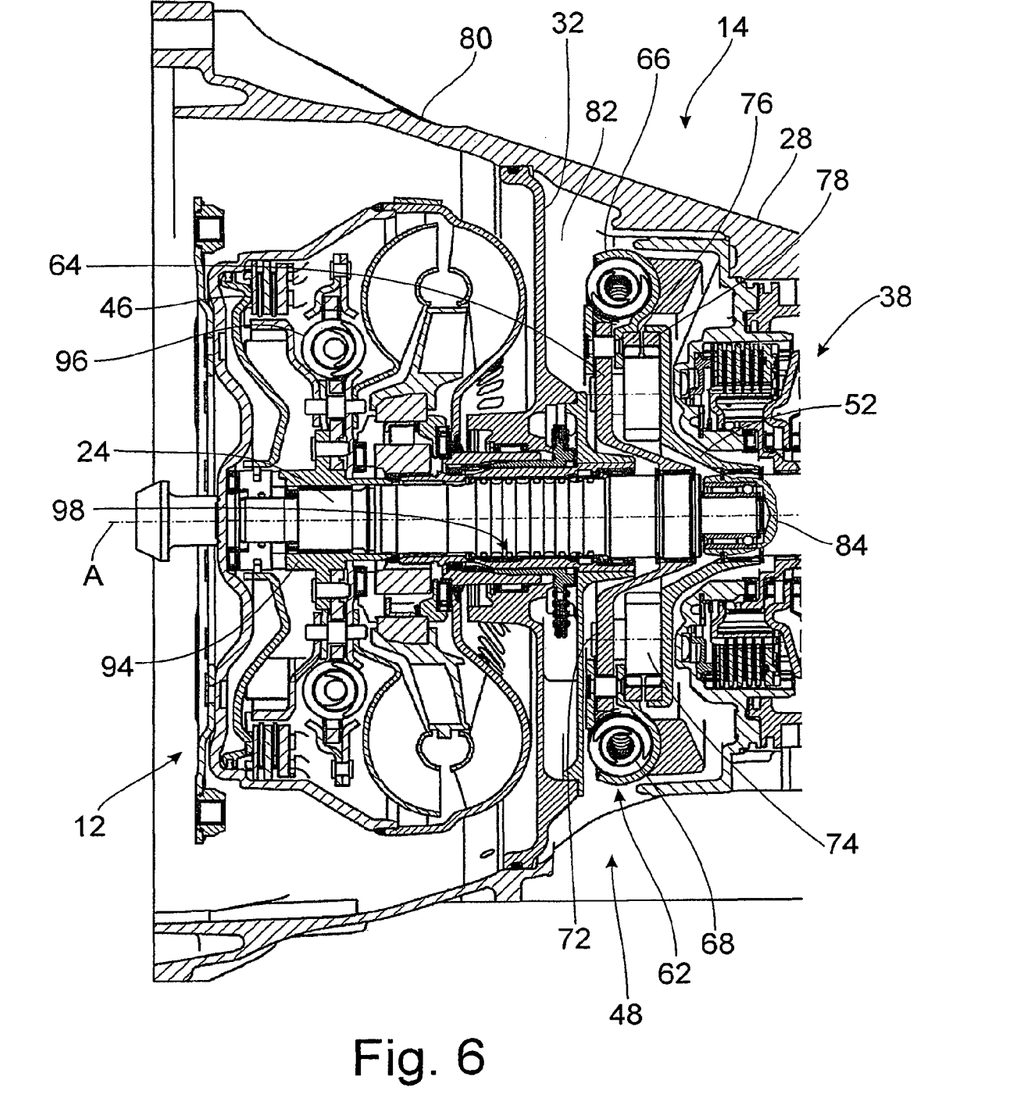
FIG. 6 is a partial longitudinal sectional view of a transmission with a hydrodynamic torque converter and torsional vibration damping arrangement integrated in the transmission.

FIG. 6 shows a structural configuration of a transmission 14 with a hydrodynamic torque converter 12, which can basically have a conventional construction and, for example, can comprise a conventional torsional vibration damper 96 in its torque transmission path between the lockup clutch 46 and the driven hub 94 which can be seen in this figure. The torque converter 12 is arranged in the volume enclosed by the transmission bellhousing 80. The transmission input shaft 24 is guided trough the housing wall 21, and a rotary through, designated in its entirety by 98, can be provided, by means of which the pressurized fluid conveyed by the pressure fluid pump can also be transmitted in the direction of the torque converter 12.

The input shaft 84 of the gear ratio changing system 38, of which only areas constructed in the manner of a disk clutch are shown by way of example, is supported by a bearing, for example, a rolling element bearing, on the end of the transmission input shaft 24 situated in the volume region 82.

In this end area, the primary side 64 of the vibration system 62 is connected to the transmission input shaft 24, the primary side 64 being formed, for example, as a central disk element. This central disk element also forms the planet wheel carrier 72 on which the planet wheels 74 are rotatably supported successively in circumferential direction. The secondary side 66 comprises two cover disk elements which extend over the damper springs 68, one of these cover disk elements being fixedly connected to the drive-side ring gear 76 or, as the case may be, being formed integrally with it.

It should be noted that the connection of the primary side 64 to the transmission input shaft 24 can be carried out, for example, by a spline, by screws or in some other way. Correspondingly, the output region 52 of the torsional vibration damping arrangement 48 can also be connected to the input shaft 84 of the gear ratio changing system so as to be fixed with respect to rotation relative to it by a spline.

Figure 7:
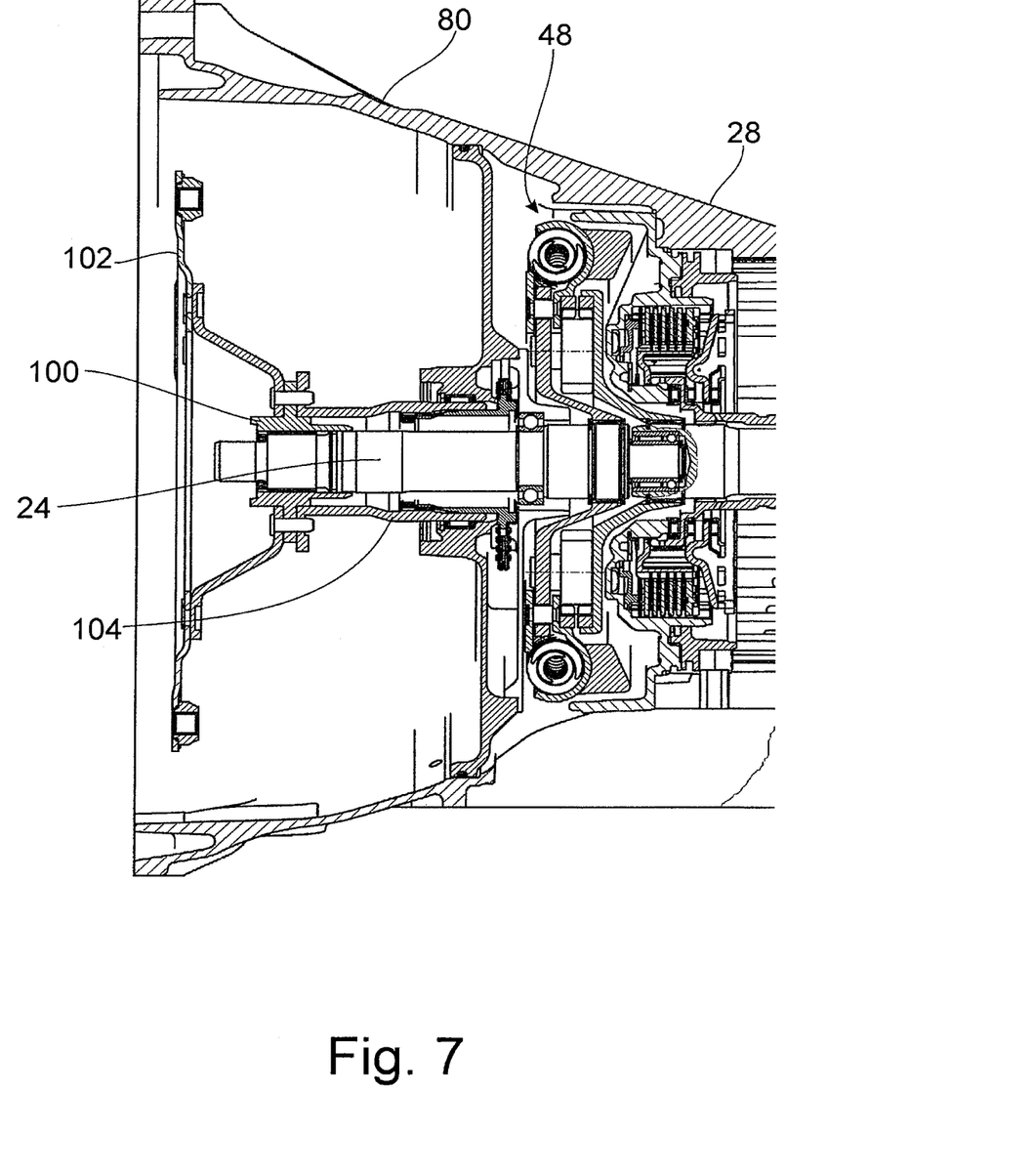
FIG. 7 is a view corresponding to FIG. 6 of an alternative type of construction without hydrodynamic torque converter.
Figure 8:
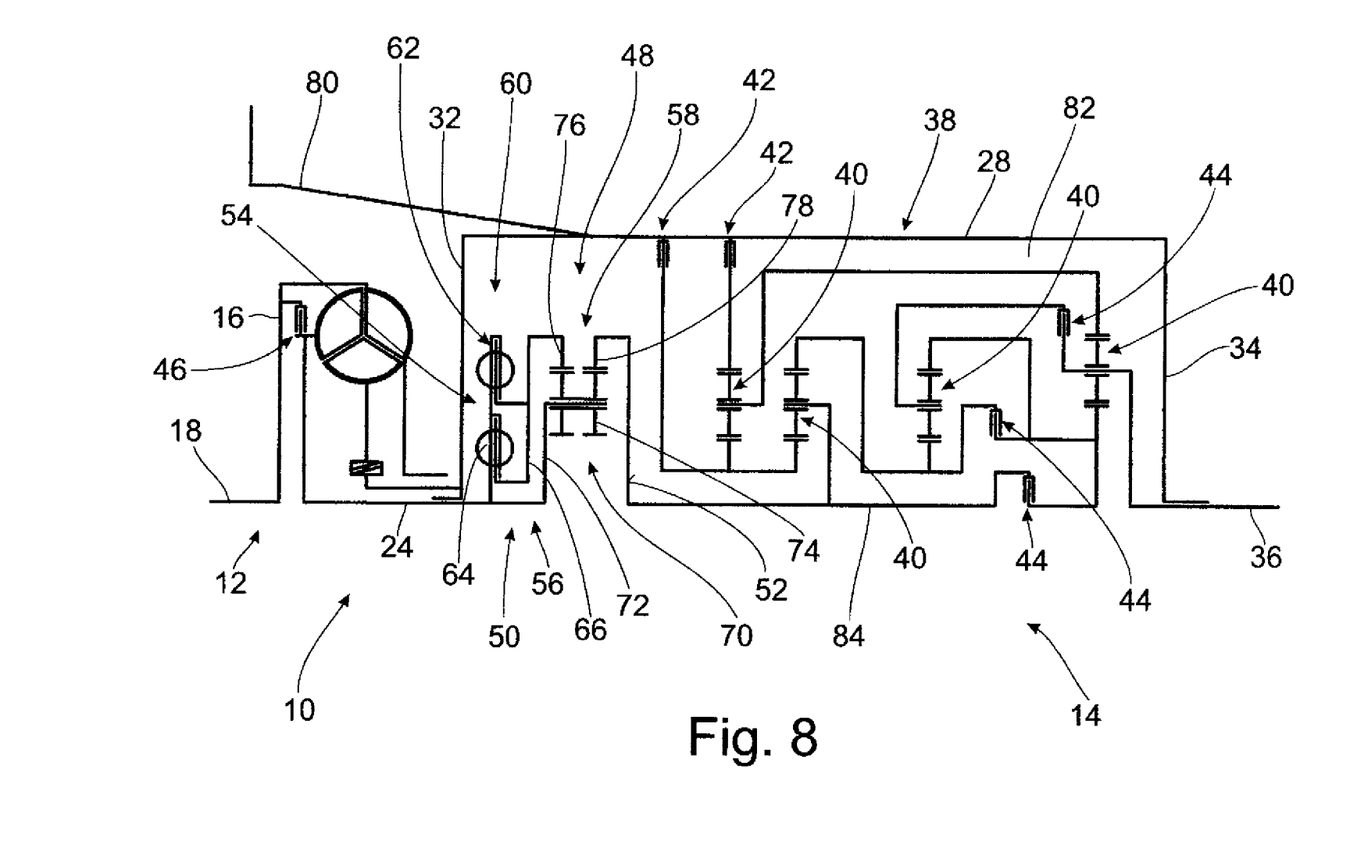
FIG. 8 is a schematic diagram of FIG. 2 showing two vibration dampers in series with one another.
Figure 9:
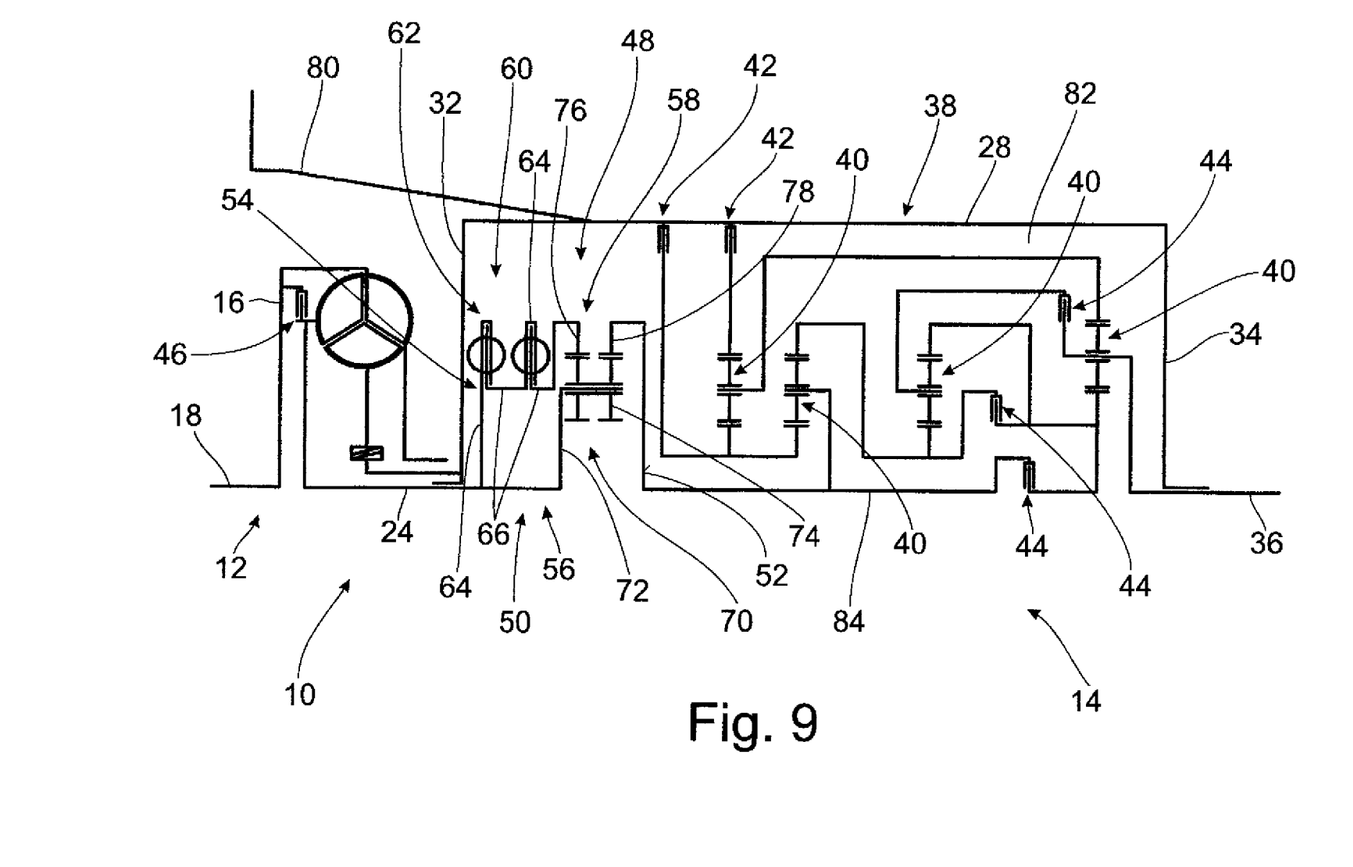
FIG. 9 is a schematic diagram of FIG. 2 showing two vibration dampers in parallel with one another.

A modification of this construction is shown in FIG. 7. It will be seen in this case that this construction corresponds to that shown in FIG. 6 with respect to the design and positioning of the torsional vibration damping arrangement 48. However, no hydrodynamic torque converter is arranged in the clutch bellhousing 80 in this case. Rather, the transmission input shaft 24 is coupled with a connection hub 100 for rotation therewith via a spline. A disk-like coupling unit 102 which can be connected, for example, via a flex plate or the like, to a driveshaft, i.e., a crankshaft, for example, is fixed to this connection hub 100. A fluid pump, which is provided in the transmission housing 28, can be driven via a pump drive hub 104, which is also fixedly connected to this coupling unit 102 and which surrounds the transmission input shaft 24. Since it is not necessary to supply fluid to a hydrodynamic torque converter, for example, a rotary through is also not provided here in the region of the transmission input shaft 24.

It should be noted that it is, of course, possible to modify the various constructional variants within the framework of the principles of the present invention. For example, instead of a transmission input shaft 24, a primary-side component part of the vibration system of the phase shifter arrangement could also be used as a transmission input element to be considered within the meaning of the present invention. This primary-side component part of the vibration system of the phase shifter arrangement could, for example, be connected directly to the coupling unit 102 shown in FIG. 7 or, as the case may be, could even make up a part of the latter when the phase shifter arrangement is positioned outside of the volume region enclosed by the transmission housing. In this sense, this coupling unit or the primary side or a primary-side component part would then be considered, for example, as a transmission input element on one hand and also at least as a partial area of the input region of the torsional vibration damping arrangement on the other hand.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A transmission for a drivetrain of a vehicle, comprising:
at least one transmission input element (24);
at least one transmission output element (36);
a gear ratio changing system (38) between the at least one transmission input element (24) and the at least one transmission output element (36);
a torsional vibration damping arrangement (48) having an input region (50) and an output region (52), the torsional vibration damping arrangement (48) being arranged between the at least one transmission input element (24) and at least one transmission output element (36) and including
a first torque transmission path (54);
a second torque transmission path (56), parallel to the first torque transmission path (54); and
a coupling arrangement (58) comprising a planetary gear arrangement (70) and configured to superpose torques transmitted via the first and second torque transmission paths (54, 56), the planetary gear arrangement comprising a planet wheel carrier (72) connected to the second torque transmission path (56) and a plurality of planet wheels (74) rotatably supported on the planet wheel carrier (72),
wherein the first torque transmission path (54), the second torque transmission path (56) and the coupling arrangement (58) are provided between the input region (50) and the output region (52), and
wherein the torsional vibration damping arrangement (48) comprises, at least in the first torque transmission path (54), a phase shifter arrangement (60) configured to generate a phase shift of rotational irregularities transmitted via the first torque transmission path (54) relative to rotational irregularities transmitted via the second torque transmission path (56);
wherein the planetary gear arrangement (70) includes a first coupling gear arrangement (76; 76') connected to the first torque transmission path (54) and in meshing engagement with the planet wheels (74), and a second coupling gear arrangement (78; 78') connected to the output region (52) and in meshing engagement with the planet wheels (74);
wherein the first coupling gear arrangement (76) and the second coupling gear arrangement (78) each comprise a ring gear arrangement (76, 78); or
wherein the first coupling gear arrangement (76') and the second coupling gear arrangement (78') each comprise a sun wheel arrangement (76', 78').

2. The transmission according to claim 1, wherein the phase shifter arrangement (60) comprises a vibration system (62) with a primary side (64) and a secondary side (66) that is rotatable relative to the primary side (64) around an axis of rotation (A) against an action of a spring arrangement (68).

3. The transmission according to claim 2, wherein the vibration system (62) includes at least two vibration dampers arranged in series with one another, each vibration damper comprising a primary side and a secondary side that are rotatable relative to each other.

4. The transmission according to claim 2, wherein the vibration system (62) includes at least two vibration dampers acting in parallel with one another, each vibration damper comprising a primary side and a secondary side that are rotatable relative to each other.

5. The transmission according to claim 1, wherein the torsional vibration damping arrangement (48) is arranged between the at least one transmission input element (24) and the gear ratio changing system (38).

6. The transmission according to claim 1, wherein the torsional vibration damping arrangement (48) is arranged between the gear ratio changing system (38) and the at least one transmission output element (36).

7. The transmission according to claim 1, further comprising a transmission housing (28), wherein the gear ratio changing system (38) is received in an enclosed volume region (82) of the transmission housing (28), and the torsional vibration damping arrangement (48) is arranged, at least partially, in the volume region (82).

8. The transmission according to claim 7, wherein a portion of the torsional vibration damping arrangement (48) is arranged outside of the volume region (82).

9. The transmission according to claim 8, wherein at least a portion of the phase shifter arrangement (60) is arranged outside of the volume region (82) and/or the coupling arrangement (58) is arranged in the volume region (82).

10. The transmission according to claim 7, wherein the torsional vibration damping arrangement (48) is arranged in its entirety in the volume region (82).

11. The transmission according to claim 1, wherein the coupling arrangement (58) forms a part of the gear ratio changing system (38).

12. The transmission according to claim 11, wherein the torque in the second torque transmission path (56) can be interrupted.

13. The transmission according to claim 1, further comprising a transmission housing (28), wherein the at least one transmission input element (24) is a transmission input shaft (24) that is rotatably supported at the transmission housing (28) and/or the at least one transmission output element (36) is a transmission output shaft (36) that is rotatably supported at the transmission housing (28).

14. The transmission according to claim 1, wherein the transmission (14) is an automatically shifting transmission.

15. The transmission according to claim 14, wherein the automatically shifting transmission is an automatic transmission or an automated transmission.

* * * * *